United States Patent [19]

Wojewoda

[11] Patent Number: 5,178,284

[45] Date of Patent: Jan. 12, 1993

[54] COMPACT DISC STAND

[75] Inventor: Igor Wojewoda, 527 A E. Speedway Blvd., Tucson, Ariz. 85705

[73] Assignee: Igor Wojewoda, Tucson, Ariz.

[21] Appl. No.: 873,244

[22] Filed: Apr. 24, 1992

[51] Int. Cl.$^5$ .............................................. A47F 5/00
[52] U.S. Cl. ...................................... 211/40; 206/387; 211/41
[58] Field of Search .................. 211/40, 41, 42, 43; 312/8, 9, 10; 206/387

[56] References Cited

U.S. PATENT DOCUMENTS

| 1,480,939 | 1/1924 | Hand | 211/40 X |
| 2,917,179 | 12/1959 | Casey et al. | 211/40 |
| 3,464,565 | 9/1969 | Nevai | 211/42 |
| 3,492,057 | 1/1970 | Watson | 211/42 X |
| 3,719,271 | 3/1973 | Authier et al. | 211/40 X |
| 4,396,123 | 8/1983 | Swan | 211/40 |
| 5,000,526 | 3/1991 | Comerford | 211/40 X |

FOREIGN PATENT DOCUMENTS 35937  2/1925  Denmark ........................... 312/12

Primary Examiner—Robert W. Gibson, Jr.

[57] ABSTRACT

Practical, aesthetic design oriented, display storage compact disc stand which provides an easy access to each cd box. A four piece, rigid structure provides support for an upright arrangement of cd boxes, cascaded horizontally in an alternating pattern causing the neighboring cd boxes in the stand to be shifted with respect to each other, while creating room for easy access to grasp each cd box independently. In addition, independent support is provided for each individual cd box without the use of neighboring compact disc boxes.

5 Claims, 2 Drawing Sheets

COMPACT DISC STAND

BACKGROUND OF THE INVENTION

1. Field of the Invention

This invention pertains to the general field of compact disc boxes storage and display stands. It provides a new way to vertically cascade cd boxes with easy access to every box, with a clear display of the content label.

2. Description of the Prior Methods

In the past few years, the use of compact discs for musical and other recordings became widely available and popular. Users of cd's often find it necessary to place their collections in particular storage containers for ease of access and organization. There are containers for cd boxes ranging from portable units to larger, stationary cases.

The existing containers take a variety of shapes. There are some which are completely enclosed, holding a large multitude of cd boxes, some of which pack the boxes tightly creating a difficulty in accessing any chosen cd box. Some use open stands which do not provide very much support for individual boxes and can only be effective with large number of cd boxes. Such arrangements do not allow for easy removal and replacement of a box in the same space from where it was removed. Also other cd boxes have to be moved to access a particular selection. In other cases, mechanical devices are used to eject a given box, leaving room for breakage and mechanical failure.

Therefore, there still remains a need for a compact disc stand which would house from one to a plurality of cd cases which are easily accessed and replaced without disturbing neighboring boxes, with clear overview of its contents, while providing an economical, aesthetic and pleasing design.

BRIEF SUMMARY OF THE INVENTION

This invention consists of a new method to support a multitude of compact disc boxes. The objective of the invention is the design of a stand which provides an easy access to each and every selected cd box. It also provides for easy placement of a cd box back into an empty location.

Another objective is the individual support for each cd case. A single cd box can be supported anywhere along the designated length of the stand. The designed partitions allow a cd box to reside in the stand without the use of other, neighboring cd boxes for its support. However, once a plurality of cd boxes is present in the stand, they can be placed close enough to each other for their faces to touch.

Yet another objective is the visual aspect of the design. Each cd box is supported in the stand while providing a clear view of its content label. This is achieved by the design which is not enclosed on all sides and therefore displays parts of each cd box.

The final objective is the stylish and easily varied in the manufacture process design of the stand. The stand can be painted in a particular color to match existing furniture components; it can be made out of oak or other wood and left in its natural state, again to suit or match existing preferences or furniture. The stand can contain sharp edges and more right angles or can be more smoothed out and rounded.

Various other purposes and advantages of the invention will become clear in the following descriptions, and particularly features pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and descriptions disclose but one of the various ways in which the invention may be practiced.

DETAILED DESCRIPTION OF THE INVENTION

The substance of this invention lies in the idea of cascading the cd boxes in a way where each cd box is easily accessed and replaced as well as displayed. The stand can be manufactured out of any applicable material such as wood, plastic mold, or other.

Referring to FIGS. 1, 2, 3 and 4, a particular realization of the stand 100 of this invention is shown. Like parts in the various figures of the drawings are identified with the same reference symbols. It should be noted that with the exception of the minimum width of the groove 21, and the minimum width of the rib 20, the rest of the dimensions are arbitrary and can be changed freely depending on the design. While only one of many ways to achieve the same result is shown, the apparatus in these figures is believed to be the best example for practicing the invention.

Figure 1:
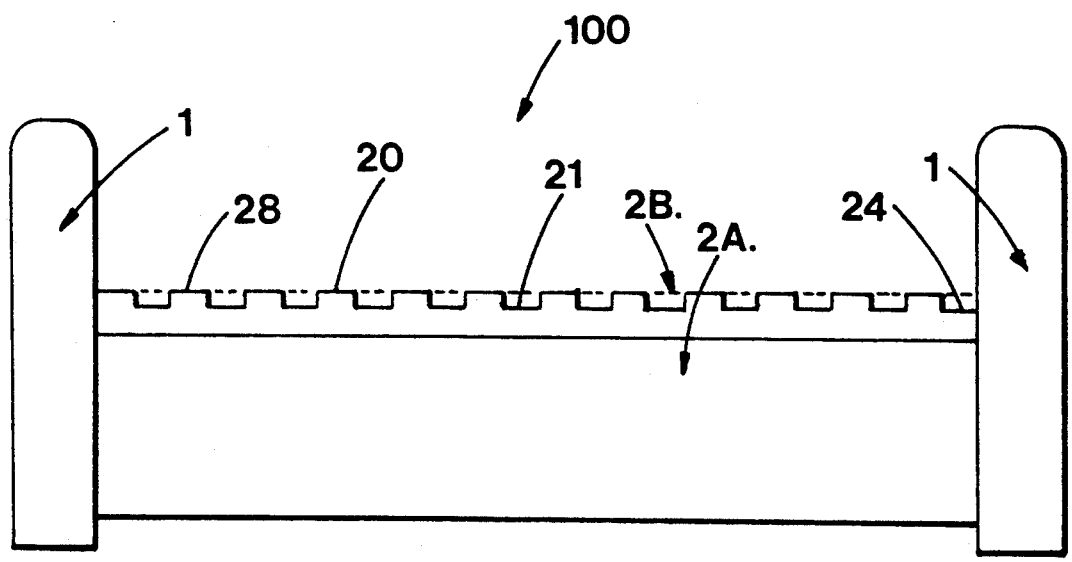
FIG. 1 shows a front view of the preferred embodiment of this invention where the top of the ribs on the back plank is drawn in phantom line for clarity.
Figure 2:
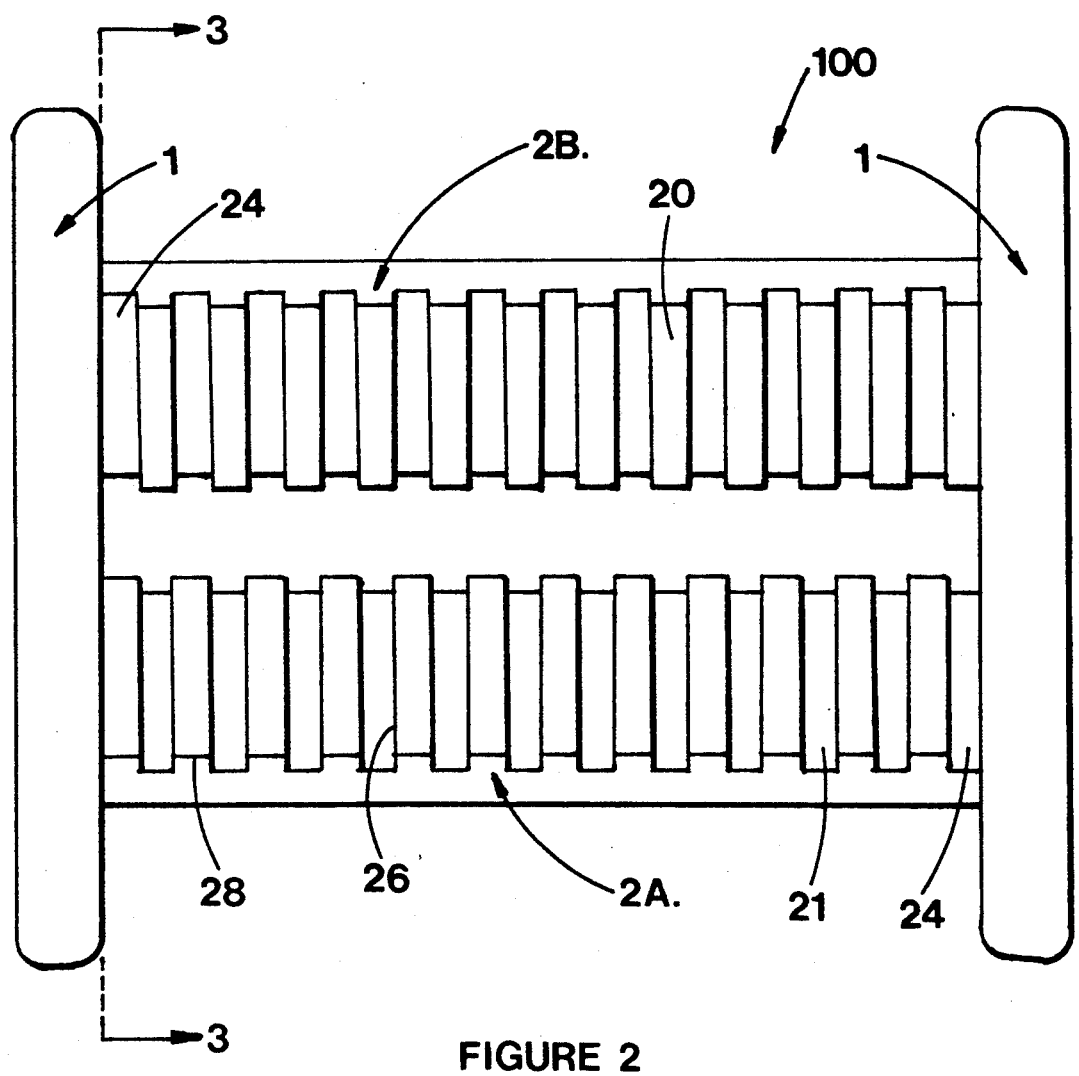
FIG. 2 displays the top view of the preferred embodiment of this invention.
Figure 3:
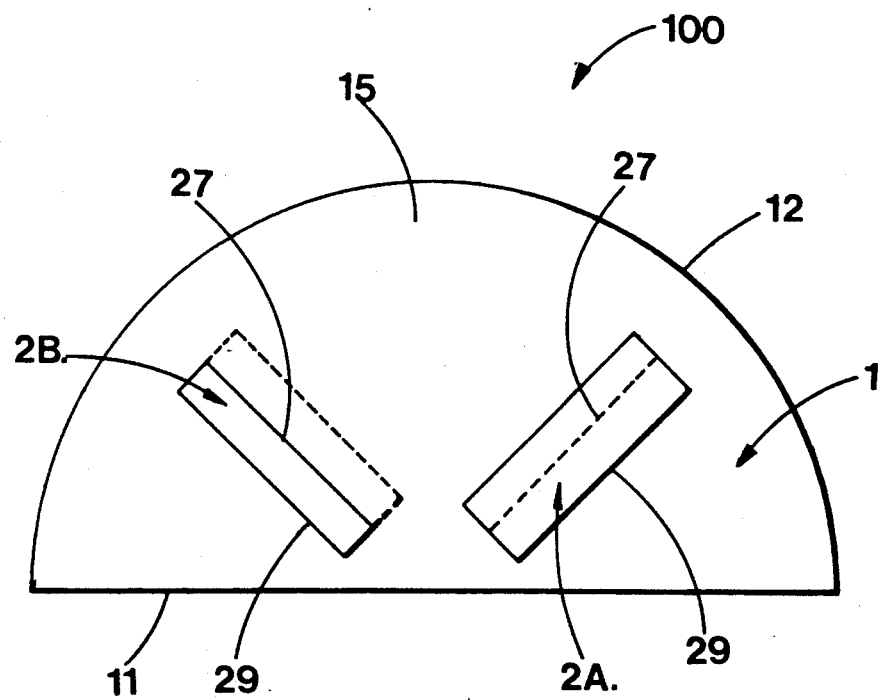
FIG. 3 shows a cross-sectional view of the stand shown in FIG. 1 taken from line 3—3.
Figure 4:
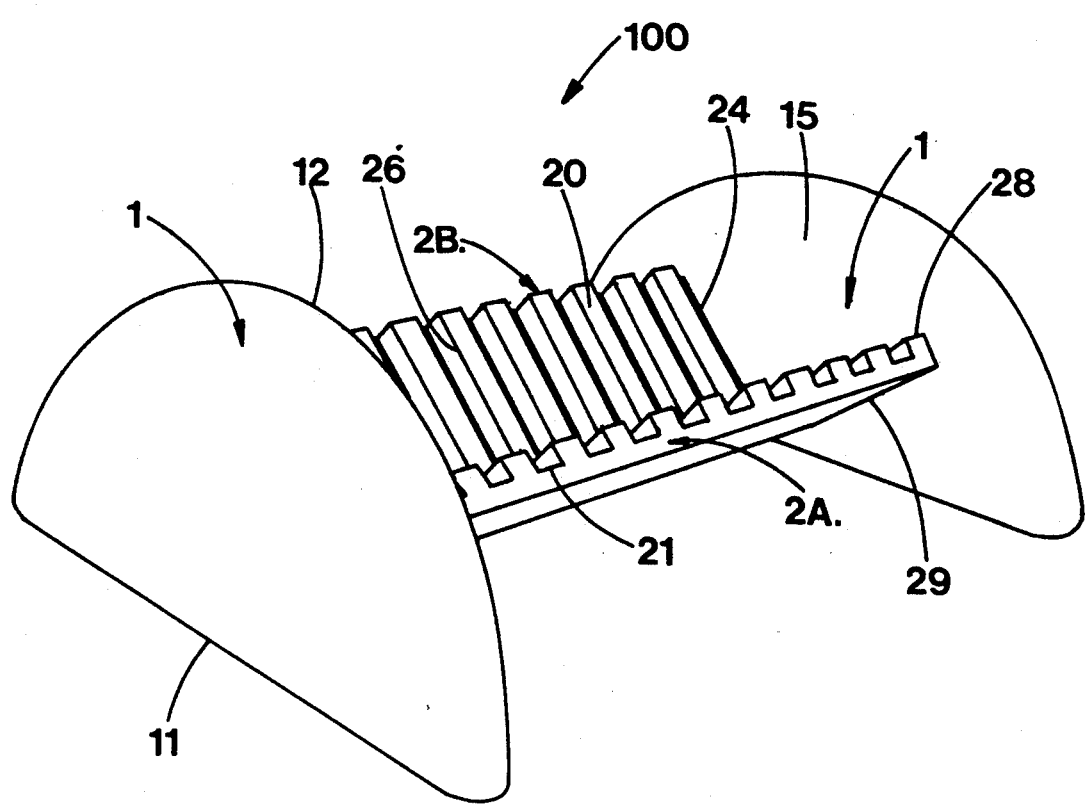
FIG. 4 illustrates a perspective view of the preferred embodiment of the compact disc stand according to this invention.

FIG. 4 illustrates an example of the compact disc stand according to this invention. The perspective view shows the main four components of the design. They are the two vertical supports 1, and the planks 2a and 2b supported by them.

Each vertical support 1 of the stand 100 consists of a vertical portion of arbitrary width. Such vertical portion comprises a standing base 11 which acts as the main contact between the stand and the standing surface. In this particular design, the vertical supports 1 are semicircles with an arbitrary radius of 5". In addition, the semicircular edge 12 of the supports 1 can be rounded off. The two identical vertical supports 1 are disposed parallel to each other, facing each other with their flat inside surfaces 15, and connected by the planks 2a and 2b.

Planks 2a and 2b connecting the two vertical supports 1 are physically exact and are differentiated here by "a" and "b" only for clarity of description, which is crucial in their placement. Any time a reference is made to part 2 alone, it refers to the structure of both part 2a and part 2b.

The plank 2 is of particular importance to the design. The plank 2 can have an arbitrary thickness of 1" and an arbitrary width of 3". The top surface of plank 2 contains a series of widthwise alternating ribs 20 and grooves 21 of equal size. The minimum width of the rib 20 is guided by the width of a given box to be stored in the stand. These ribs 20, in case of a single cd box, have a width of exactly 7/16" or slightly more. The ribs 20 are separated from each other by the exact distance of their width, therefore defining a groove 21 between two consecutive ribs. This pattern does not hold for the last groove 24 on the plank, which is defined by only one rib 20 and the end of the plank and by the inside surface 15 of the vertical support 1. The last groove 24 however, has a width of that of any other groove 21. The number of ribs 20 is equal to the number of grooves 21, each of which is equal to half of the arbitrary maximum number of cd boxes to be stored in the stand 100. This pattern on the top surface of the plank 2 defines its total length which comprises of the total widths of all the ribs 20 and all the grooves 21 described.

The height of the ribs 20 is determined in a way as to provide vertical support from its edges 26 to the face of a cd box. The arbitrary height of the ribs 20 in the stand 100 is ¼". The height of the ribs 20 automatically defines the depth of each groove 21. For aesthetic purposes only, the top edge 28 of the plank can be rounded off with an arbitrary radius not shown in the drawings for clarity.

The arrangement of planks 2a and 2b with respect to each other as well as to the vertical supports 1 is critical. Each plank 2 directs its ribs 20 and grooves 21 towards the upward-center part of the stand 100. One of the critical features of the placement of the planks 2 is a ninety degree angle between the top surfaces of the planks 2a and 2b, where the ribs 20 and grooves 21 are located. Another crucial arrangement is the placement of the plank 2a with respect to the plank 2b. Each groove 21 on plank 2a must face a rib 20 on the opposite plank 2b, just as each groove 21 on plank 2b must face a rib 20 on the opposite plank 2a.

These two planks 2 are connected to and supported by the vertical supports 1. As clearly seen in FIG. 3, in the preferred embodiment of the stand 100, each plank 2a and 2b creates a 45 degree angle between its widthwise edge 29 and the standing surface, which is defined by the standing base 11. In addition, the centerlines 27, which correspond to the bottom of the grooves 21, of planks 2a and 2b are placed on two planes passing through the radii of the semicircular vertical supports 1, which are defined at 45 and 135 degrees from the standing base 11 of the stand 100. Planks 2a and 2b are mounted radially at an arbitrary distance greater than ½" from the centers of the standing bases 11 of the vertical supports 1.

Such design allows for each cd box placed in the stand 100 to be elevated at the rib 20, and sunk in at the opposing groove 21. The alternating pattern causes the faces of the neighboring cd boxes in the stand 100 to be shifted with respect to each other, creating room for easy access to grasp each cd box independently. In addition, the edges of the grooves 26, provide support by applying a torque to individual faces of each cd box making it possible to store a cd box independent from any other in the stand 100.

Again, it should be noted that the only critical dimension is the width of the rib 20 and groove 21, each being around 7/16 of an inch for a single cd box. Also the 90 degree angle between the top surfaces of both planks 2a and 2b is crucial.

Therefore, while the present invention has been shown and described herein in what is believed to be the most practical and preferred embodiment, it is recognized that departures can be made therefrom within the scope of the invention, which is not to be limited to the details disclosed herein but is to be accorded the full scope of the claims so as to embrace any and all equivalent apparatuses and methods.

I claim:

1. A compact disc storage and display stand comprising:

two vertical supports each consisting of a vertical portion having a base for resting on a supporting structure; and two planks, each having a top surface and a bottom surface, wherein said top surfaces are disposed opposite to each other at a 90 degree angle, and wherein said planks are attached to and supported by said two vertical supports;

wherein the top surface of each of said planks comprises of a multiplicity of alternating equal-width ribs and grooves; and wherein each rib on a plank corresponds to a groove in the opposite plank.

2. The apparatus described in claim 1, wherein said two planks are positioned at a 45 degree angle with reference to the base of said two vertical supports.

3. The apparatus described in claim 1, wherein the width of said ribs and grooves is approximately 7/16 of an inch.

4. The apparatus described in claim 1, wherein said grooves are approximately ¼ of an inch deep.

5. The apparatus described in claim 1, wherein said two vertical supports are semicircular.

* * * * *